June 14, 1960
C. V. DAVID
2,940,691
VERTICAL TAKE-OFF POWER PLANT SYSTEM
Filed Nov. 24, 1958
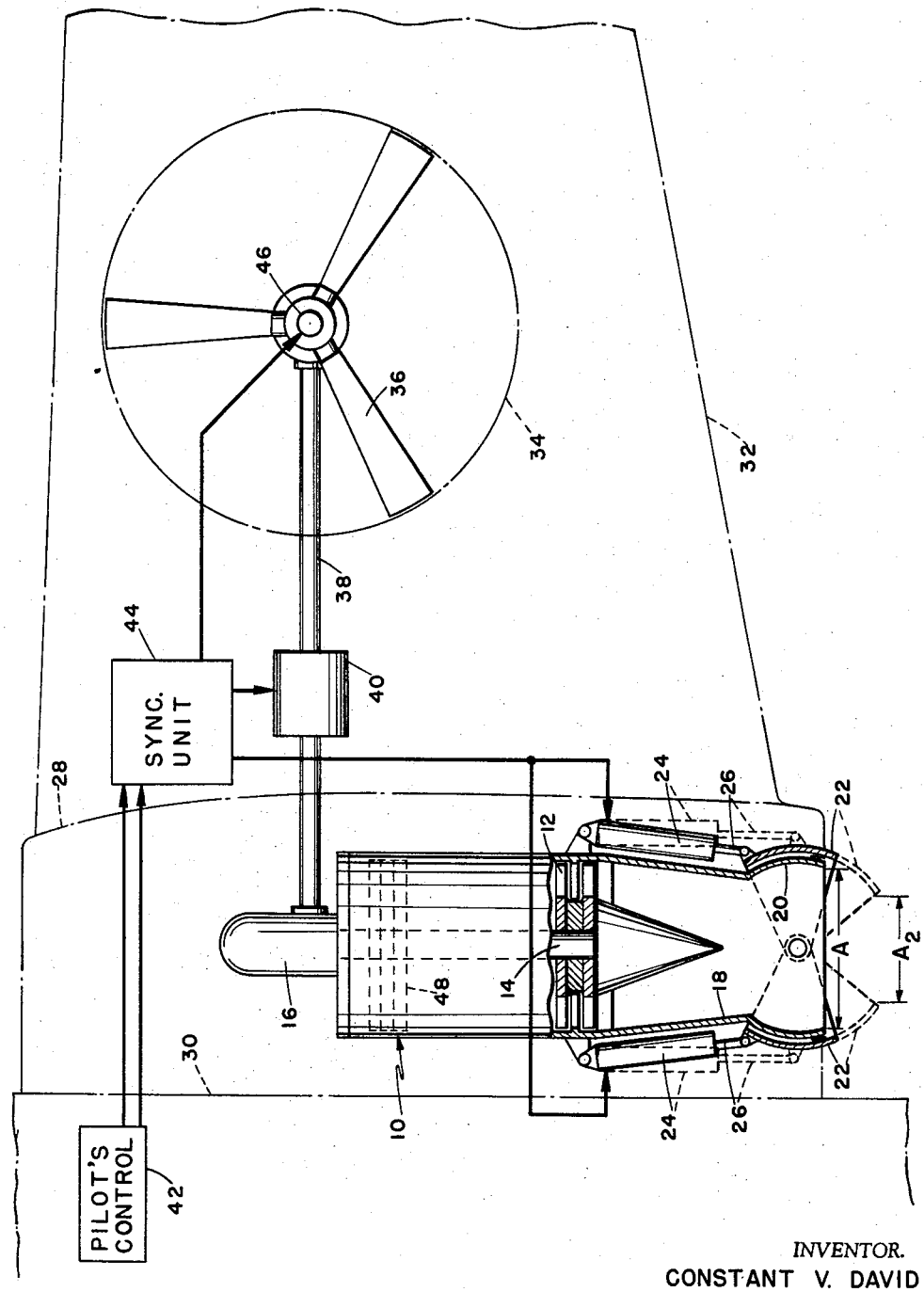
INVENTOR.
CONSTANT V. DAVID
BY
Knox & Knox

United States Patent Office 2,940,691
Patented June 14, 1960

2,940,691

VERTICAL TAKE-OFF POWER PLANT SYSTEM

Constant V. David, San Diego, Calif., assignor to Ryan Aeronautical Co., San Diego, Calif.

Filed Nov. 24, 1958, Ser. No. 775,796

4 Claims. (Cl. 244—12)

The present invention relates generally to aircraft propulsion and more particularly to a vertical take-off power plant system.

The primary object of this invention is to provide an aircraft power plant system in which a gas turbine type engine drives a lifting fan or propeller for vertical flight and converts to pure jet thrust for horizontal flight.

Another object of this invention is to provide a power plant system in which a single shaft turboprop engine is used to drive a lifting fan, the tailpipe outlet area of the engine being controlled to vary the proportion of thrust to fan shaft power during transition from vertical to horizontal flight and the reverse.

Another object of this invention is to provide a power plant system in which the fan pitch is controlled in synchronization with the tailpipe area so that the fan absorbs only the shaft power available, the turbine speed remaining substantially constant.

A further object of this invention is to provide a power plant system in which the fan can be completely disconnected from the engine in forward flight, so that all power is available as jet thrust.

Finally, it is an object to provide an aircraft power plant system of the aforementioned character which is simple, safe and efficient to operate and which will give efficient and fully controllable performance.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which the single figure is a somewhat diagrammatic top plan view of the power plant system, portions of aircraft structure being indicated in broken outline.

The system includes a turboprop engine 10 of the single shaft type, having a turbine 12 mounted on a shaft 14 and driving a gearbox 16 mounted at the front of said engine. Extending rearwardly from the turbine 12 is a tailpipe 18 having an outlet nozzle 20, through which the engine exhaust gases are ejected. Mounted externally on the nozzle 20 are two shell elements 22 pivotally mounted on an axis diametrical of the nozzle and disposed on opposite sides thereof. Attached to the engine 10 are two jacks 24 having actuating rods 26 which are connected to the shell elements 22 so that, by operating said jacks, the shell elements can be swung inwardly across the nozzle 20. This structure is similar to the conventional type of variable area nozzle used on many jet engines and the specific structural arrangement is not critical.

The engine 10 is mounted in an aircraft in a normal manner, the partial outline of an aircraft indicated in broken line showing the engine contained in a nacelle 28 at the side of the fuselage 30, one wing 32 extending from said nacelle. In the wing 32 is a large circular duct 34 extending vertically through the wing, and mounted axially in said duct is a multi-bladed fan 36 designed to provide a downwardly directed airflow for vertical lift of the aircraft. The fan 36 is driven by a drive shaft 38 from the gearbox 16, a clutch 40 being installed in said drive shaft to disengage the fan when not in use.

It will be evident that by driving the fan 36, vertical thrust is produced to lift the aircraft vertically, and by disengaging the fan and utilizing only the jet thrust of the engine 10, the aircraft is propelled in forward flight. In such a simplified arrangement, however, transition from vertical to horizontal flight would be abrupt and difficult to control. Further, the jet thrust of a conventional turboprop engine is small compared to the shaft power developed and would normally be insufficient to maintain level flight at any reasonable speed. It is therefore necessary to provide smooth transition from vertical to horizontal flight, and back again, while changing the thrust characteristics of the turboprop engine to produce sufficient useful forward thrust. In order to coordinate the operation of the various parts of the system, the pilot's control unit 42 is connected to a synchronizing unit 44 which supplies the control impulses to the jacks 24, clutch 40 and to the pitch control mechanism 46 of the fan 36, variable pitch control of the fan being essential. The synchronizing unit 44 may be electronic, electromechanical or of any other suitable type in nature according to the particular units to be controlled, since the jacks, clutch and pitch control mechanism may be electrically or fluid operation, or combinations of both.

In the turboprop engine 10, the power produced by the turbine 12 drives the engine compressor, indicated in dash line at 48, and the gearbox 16, the turbine power output being determined by the pressure drop from the combustion side of the turbine to the tailpipe 18 where the gases are exhausted. The power required by the compressor 48 is substantially constant for a given speed of rotation, so that any decrease in turbine power output, without a decrease in rotational speed, results in a loss of power at the gearbox 16. Thus by controlling the pressure drop across the turbine 12, the power to the gearbox 16 can be controlled without loss of engine speed.

For vertical flight the engine 10 is operated with the shell elements 22 fully retracted, as shown in full line, exposing the full area of the nozzle 20, indicated at A. In this position the pressure drop across the turbine 12 is at a maximum and full power is applied to the gearbox 16 to rotate the fan 36. By regulating the engine speed and the pitch of the fan 36, the vertical flight speed of the aircraft is controlled, from hovering to full speed ascent or descent. When transition from vertical to horizontal flight is desired, the shell elements 22 are gradually extended to close off a portion of the nozzle 20. This action increases the back pressure in the tailpipe 18 and causes a decrease in the pressure drop across the turbine 12, so decreasing the power to the gearbox 16. Simultaneously the pitch of the fan blades is decreased in accordance with the decreased power, the ratio being maintained by the synchronizing unit 44, so that the engine speed remains substantially constant to avoid an overall power loss. With the higher tailpipe pressure, the exhaust gases leave the reduced area nozzle at higher velocity and provide level flight thrust. As transition is continued, the shell elements 22 are closed to the position indicated in dash line to reduce the nozzle outlet area to a predetermined minimum, as indicated at A2. This minimum nozzle area is such that the pressure drop across the turbine 12 reduces the turbine output power to a value sufficient to drive the compressor only, the power to the gearbox 16 being virtually zero. In this condition, the blades of the fan 36 are feathered and the fan may be disengaged by means of the clutch 40. This action is again controlled by the synchronizing unit 44. Alternatively, the clutch 40 may be omitted and the fan 36 allowed to spin in a feathered or zero thrust condition consuming a minimum of power during level flight, the gyroscopic effect of the fan providing a stabilizing action which is desirable under normal conditions.

With the nozzle 20 at minimum area, the exhaust gas velocity is at a maximum and provides thrust for high speed forward flight. It has been found that the turboprop engine has a thrust loss of approximately 5% when operated as a turbojet in level flight, but this slight loss is negligible in view of the utility of the complete system for vertical and horizontal flight.

For transition from horizontal to vertical flight, the procedure is reversed. The shell elements 22 are gradually retracted to reduce thrust and lose forward speed, while the fan 36 is engaged and the blade pitch gradually increased to absorb the turbine output power. As the aerodynamic lift of the aircraft wings decreases with the reduced forward speed, the necessary lift is provided by the fan until the aircraft is hovering or in controlled descent or ascent.

It will be evident that the system can be applied to single or multi-engined arrangements, that illustrated being one half of a symmetrical twin-engined installation having a lifting fan in each wing. Various structural details common to aircraft and engine installations have been omitted from the drawing since the arrangements may vary considerably according to requirements.

It is important to note that this invention is especially well adapted for use with fan-in-wing structures employing upper and lower vane assemblies, not shown, controlling the direction of air flow into and from the duct 34 in which the fan 36 is mounted. Such vane assemblies provide for braking as wall as propulsion of the aircraft, and enable the sealing of the upper and lower ends of the duct for high speed forward flight. When such upper and lower vane assemblies are employed, the controls for the same are properly correlated with the hereindisclosed control 42.

The operation of this invention will be clearly comprehended from a consideration of the foregoing description of the mechanical details thereof, taken in connection with the drawing and the above recited objects. It will be obvious that all said objects are amply achieved by this invention.

I claim:

1. In an aircraft, a power plant system comprising: a turboprop engine having a turbine driven drive shaft and an exhaust gas conducting tailpipe; said tailpipe having a variable area outlet nozzle; a vertically thrusting fan mounted in said aircraft and operatively connected to said drive shaft; said fan having blade pitch changing means thereon; and control means operatively interconnecting said nozzle and said pitch changing means and adapted to decrease the pitch of said fan in direct proportion to a decrease in area of said nozzle, forward thrust being realized when the nozzle is partially closed and said fan providing vertical lift when the blade pitch is high and maintaining its gyroscopic stabilization effect when feathered.

2. In an aircraft, a power plant system comprising: a turboprop engine having a turbine driven drive shaft and an exhaust gas conducting tailpipe; said tailpipe having a variable area outlet nozzle; a vertically thrusting fan mounted in said aircraft and operatively connected to said drive shaft; said fan having blade pitch changing means thereon; and control means operatively interconnecting said nozzle and said pitch changing means and adapted to decrease the pitch of said fan in direct proportion to a decrease in area of said nozzle; a clutch connected between said fan and said drive shaft; said clutch being connected to said control means to disengage said fan from said drive shaft when the pitch of the fan is at a predetermined minimum.

3. In an aircraft, a power plant system comprising: a turboprop engine having a turbine driven drive shaft and an exhaust gas conducting tailpipe; said tailpipe having an outlet nozzle; area control elements movably mounted on said nozzle; actuators connected to said elements to vary the area of said nozzle; a vertically thrusting ducted fan mounted in said aircraft and operatively connected to said drive shaft; said fan having blade pitch changing means thereon; a synchronizing unit interconnecting said actuators and said pitch changing means to decrease the pitch of said fan blades in direct proportion to a decrease in area of said nozzle; and pilot operated control means coupled to said synchronizing unit.

4. In an aircraft, a power plant system comprising: a turboprop engine having a turbine driven drive shaft and an exhaust gas conducting tailpipe; said tailpipe having an outlet nozzle; area control elements movably mounted on said nozzle; actuators connected to said elements to vary the area of said nozzle; a vertically thrusting ducted fan mounted in said aircraft and operatively connected to said drive shaft; said fan having blade pitch changing means thereon; a synchronizing unit interconnecting said actuators and said pitch changing means to decrease the pitch of said fan blades in direct proportion to a decrease in area of said nozzle; pilot operated control means connected to said synchronizing unit to control said actuators and said pitch changing means; and a clutch connected between said fan and said drive shaft; said clutch being coupled to said synchronizing unit, to disengage said fan when the blade pitch thereof is at a minimum.

References Cited in the file of this patent

UNITED STATES PATENTS 1,769,487    Boney  ---------------- July 1, 1930